(12) United States Patent
Byeon

(10) Patent No.: US 10,781,821 B2
(45) Date of Patent: Sep. 22, 2020

(54) FAN MOTOR AND VEHICLE COMPRISING SAME

(71) Applicant: LG INNOTEK CO., LTD., Seoul (KR)

(72) Inventor: Dae Gil Byeon, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 86 days.

(21) Appl. No.: 16/319,226

(22) PCT Filed: Jul. 19, 2017

(86) PCT No.: PCT/KR2017/007759
§ 371 (c)(1),
(2) Date: Jan. 18, 2019

(87) PCT Pub. No.: WO2018/016867
PCT Pub. Date: Jan. 25, 2018

(65) Prior Publication Data
US 2019/0277299 A1    Sep. 12, 2019

(30) Foreign Application Priority Data

Jul. 19, 2016  (KR) .......................... 10-2016-0091482

(51) Int. Cl.
*H02K 5/16* (2006.01)
*F04D 29/056* (2006.01)
(Continued)

(52) U.S. Cl.
CPC ........... *F04D 29/056* (2013.01); *F04D 17/16* (2013.01); *F04D 25/06* (2013.01); *F04D 29/059* (2013.01);
(Continued)

(58) Field of Classification Search
CPC .. H02K 7/14; H02K 1/14; H02K 1/27; H02K 3/52; H02K 5/02; H02K 5/173;
(Continued)

(56) References Cited

U.S. PATENT DOCUMENTS

| 4,634,908 A | 1/1987 | Sturm |
| 2004/0136842 A1 | 7/2004 | Obara et al. |

(Continued)

FOREIGN PATENT DOCUMENTS

| CN | 103248163 | 8/2013 |
| EP | 0 167 749 | 1/1986 |

(Continued)

OTHER PUBLICATIONS

International Search Report (with English Translation) and Written Opinion dated Oct. 20, 2017 issued in Application No. PCT/KR2017/007759.

(Continued)

*Primary Examiner* — Thanh Lam
(74) *Attorney, Agent, or Firm* — KED & Associates, LLP

(57) ABSTRACT

Provided herein is a fan motor including a columnar portion including a first accommodating portion, a second accommodating portion, and a third accommodating portion, wherein the first accommodating portion and the second accommodating portion are disposed at an upper portion and a lower portion, respectively, and have an inner diameter larger than an inner diameter of an inner circumferential surface of the columnar portion, the third accommodating portion is disposed between the first accommodating portion and the second accommodating portion, an inner diameter of the third accommodating portion is smaller than a diameter of the inner circumferential surface of the columnar portion, and the inner diameter of the first accommodating portion and the inner diameter of the second accommodating portion are larger than the diameter of the inner circumferential surface of the columnar portion.

11 Claims, 7 Drawing Sheets

(51) Int. Cl.
| | |
|---|---|
| *F04D 17/16* | (2006.01) |
| *F04D 25/06* | (2006.01) |
| *F04D 29/059* | (2006.01) |
| *F04D 29/42* | (2006.01) |
| *H02K 5/24* | (2006.01) |
| *H02K 7/08* | (2006.01) |
| *H02K 7/14* | (2006.01) |
| *H02K 21/22* | (2006.01) |
| *H02K 5/02* | (2006.01) |
| *H02K 5/173* | (2006.01) |
| *H02K 1/27* | (2006.01) |
| *H02K 1/14* | (2006.01) |
| *H02K 3/52* | (2006.01) |

(52) U.S. Cl.
CPC ........... *F04D 29/4206* (2013.01); *H02K 1/14* (2013.01); *H02K 1/27* (2013.01); *H02K 3/52* (2013.01); *H02K 5/02* (2013.01); *H02K 5/173* (2013.01); *H02K 5/24* (2013.01); *H02K 7/08* (2013.01); *H02K 7/085* (2013.01); *H02K 7/14* (2013.01); *H02K 21/22* (2013.01)

(58) Field of Classification Search
CPC ............ H02K 5/24; H02K 7/08; H02K 7/085; H02K 21/22; F04D 29/056; F04D 17/16; F04D 25/06; F04D 29/059; F04D 29/4206
USPC ...................................... 310/90, 67 R, 62–63
See application file for complete search history.

(56) References Cited

U.S. PATENT DOCUMENTS

| | | | | |
|---|---|---|---|---|
| 2004/0145260 A1* | 7/2004 | Tamaoka | ................ | F16C 33/74 310/90 |
| 2008/0203838 A1* | 8/2008 | Komori | ................ | F16C 33/107 310/90 |
| 2010/0231074 A1* | 9/2010 | Yamashita | ............ | F16C 33/107 310/90 |
| 2010/0244601 A1* | 9/2010 | Shimizu | ................ | F16C 17/107 310/90 |
| 2011/0317949 A1* | 12/2011 | Ito | ......................... | F16C 33/104 384/100 |
| 2013/0101450 A1* | 4/2013 | Kimura | ............... | F04D 25/0626 417/423.7 |
| 2013/0163910 A1* | 6/2013 | Corona | ................ | F16C 35/067 384/490 |
| 2014/0346903 A1 | 11/2014 | Yim et al. | | |
| 2016/0065029 A1* | 3/2016 | Nakano | ................ | H02K 5/1675 310/90 |

FOREIGN PATENT DOCUMENTS

| | | |
|---|---|---|
| JP | S56-96870 | 7/1981 |
| JP | 2000-249151 | 9/2000 |
| JP | 2001-295837 | 10/2001 |
| JP | 2002-171718 | 6/2002 |
| JP | 2003-032947 | 1/2003 |
| JP | 2006-074964 | 3/2006 |
| JP | 2015-163038 | 9/2015 |
| KR | 10-2014-0139662 | 12/2014 |
| WO | WO 0145233 | 6/2001 |

OTHER PUBLICATIONS

European Search Report dated Jan. 16, 2020 issued in Application No. 17831340.9.
Chinese Office Action dated Mar. 20, 2020 issued in Application No. 201780045232.0.

* cited by examiner

FAN MOTOR AND VEHICLE COMPRISING SAME

CROSS-REFERENCE TO RELATED PATENT APPLICATIONS

This application is a U.S. National Stage Application under 35 U.S.C. § 371 of PCT Application No. PCT/KR2017/007759, filed Jul. 19, 2017, which claims priority to Korean Patent Application No. 10-2016-0091482, filed Jul. 19, 2016, whose entire disclosures are hereby incorporated by reference.

TECHNICAL FIELD

Embodiments relate to a fan motor and a vehicle including the same.

BACKGROUND ART

A fan motor is an air blowing device in which a blade is coupled to a rotor to supply or discharge air. The fan motor includes the rotor, a stator, and the blade. The rotor may be disposed outside the stator.

A coil forming a rotating magnetic field may be wound around the stator and cause an electrical interaction with the rotor to induce rotation of the rotor. When the rotor rotates, the blade coupled to the rotor rotates.

A housing of the fan motor includes a rotor, a stator, and a fan disposed therein. Also, a columnar portion is formed in the housing. A rotating shaft is rotatably inserted into the columnar portion, and the stator is mounted at an outer circumferential surface of the columnar portion.

In this case, a bearing coupled to the rotating shaft may be installed at the columnar portion. Generally, a ball bearing is installed to axially support the rotating shaft. There are various types of bearings. Particularly, a sintered bearing including oil therein is low-cost and thus is advantageous for lowering the unit cost of the product. However, because the shapes of the ball bearing and the sintered bearing are different, there is a problem in that the shape of the housing also has to be changed according to the type of the bearing.

DISCLOSURE

Technical Problem

Accordingly, embodiments are for solving the above-described problem, and an object of the present invention is to provide a fan motor, which is capable of selectively using a ball bearing and a sintered bearing, and a vehicle including the same.

Objects of the present invention are not limited to that mentioned above, and other objects not mentioned herein should be clearly understood by those of ordinary skill in the art from the description below.

Technical Solution

To achieve the above object, the present invention provides a fan motor including a rotating shaft, a stator including a hole in which the rotating shaft is disposed, a rotor disposed outside the stator, a fan coupled to the rotating shaft, and a housing disposed below the fan, wherein the housing includes a columnar portion protruding upward in a cylindrical shape from a lower surface of the housing and having an inner circumferential surface, the rotating shaft is rotatably inserted into the columnar portion, the columnar portion is disposed inside the stator, the rotating shaft is disposed inside the columnar portion, the stator is coupled to an outer side of the columnar portion, the rotor is coupled to the rotating shaft and disposed outside the stator, the fan is coupled to the rotating shaft, the columnar portion includes a first accommodating portion, a second accommodating portion, and a third accommodating portion, the first accommodating portion and the second accommodating portion are disposed at an upper portion and a lower portion, respectively, and have an inner diameter larger than an inner diameter of an inner circumferential surface of the columnar portion, the third accommodating portion is disposed between the first accommodating portion and the second accommodating portion, an inner diameter of the third accommodating portion is smaller than a diameter of the inner circumferential surface of the columnar portion, and the inner diameter of the first accommodating portion and the inner diameter of the second accommodating portion are larger than the diameter of the inner circumferential surface of the columnar portion.

The fan motor may further include a ball bearing, wherein the ball bearing may be disposed at the first accommodating portion and the second accommodating portion.

The fan motor may further include a sintered bearing, wherein the sintered bearing may be disposed at the third accommodating portion.

A boundary between the third accommodating portion and the inner circumferential surface of the columnar portion may include a chamfered surface.

The first accommodating portion and the third accommodating portion may be disposed to be spaced apart from each other.

The second accommodating portion and the third accommodating portion may be disposed to be spaced apart from each other.

The columnar portion may include a spatial portion having an inner diameter larger than the inner diameter of the second accommodating portion below the second accommodating portion.

The housing may further include a cover portion configured to cover the spatial portion.

The rotor may include a yoke coupled to the rotating shaft and a magnet coupled to an inner circumferential surface of the yoke.

The stator may include a stator core and a coil wound around teeth of the stator core.

The first accommodating portion and the second accommodating portion may include a washer.

The first accommodating portion may include a damper disposed between the washer and the ball bearing.

The inner diameter of the first accommodating portion and the inner diameter of the second accommodating portion may be formed to be the same.

The fan motor may further include a spatial portion disposed between the sintered bearing and the inner circumferential surface of the columnar portion.

An inner diameter of the sintered bearing in an area horizontally corresponding to the third accommodating portion and an inner diameter of the sintered bearing in an area horizontally corresponding to the first accommodating portion and the second accommodating portion may be different.

The fan motor may further include a stepped portion disposed between the first accommodating portion and the second accommodating portion and the inner circumferential surface of the columnar portion so that the ball bearing is seated thereon.

A boundary between the inner circumferential surface of the columnar portion and the third accommodating portion may be formed with a chamfered surface having a predetermined slope.

To achieve the above object, the present invention provides a vehicle including a fan motor including a rotating shaft, a stator including a hole in which the rotating shaft is disposed, a rotor disposed outside the stator, a fan coupled to the rotating shaft, and a housing disposed below the fan, wherein the housing includes a columnar portion protruding upward in a cylindrical shape from a lower surface of the housing and having an inner circumferential surface, the columnar portion is disposed inside the stator, the rotating shaft is disposed inside the columnar portion, the columnar portion includes a first accommodating portion, a second accommodating portion, and a third accommodating portion, the third accommodating portion is disposed between the first accommodating portion and the second accommodating portion, an inner diameter of the third accommodating portion is smaller than a diameter of the inner circumferential surface of the columnar portion, and an inner diameter of the first accommodating portion and an inner diameter of the second accommodating portion are larger than the diameter of the inner circumferential surface of the columnar portion.

Advantageous Effects

According to embodiments, there is an advantageous effect in that it is possible to selectively use a ball bearing and a sintered bearing.

MODES OF THE INVENTION

Hereinafter, exemplary embodiments of the present invention will be described in detail with reference to the accompanying drawings. Objects, specific advantages, and novel features of the present invention will become more apparent from the detailed description and exemplary embodiments below related to the accompanying drawings. Also, the terms or words used in the present specification and the claims should not be limitedly interpreted in their general or dictionary meanings but, based on the principle that an inventor may properly define concepts of terms to describe his or her invention in the best possible way, should be interpreted in meanings and concepts in accordance with the technical idea of the present invention. In addition, in describing the present invention, detailed description of a known related art that may unnecessarily obscure the gist of the present invention will be omitted.

Figure 1:
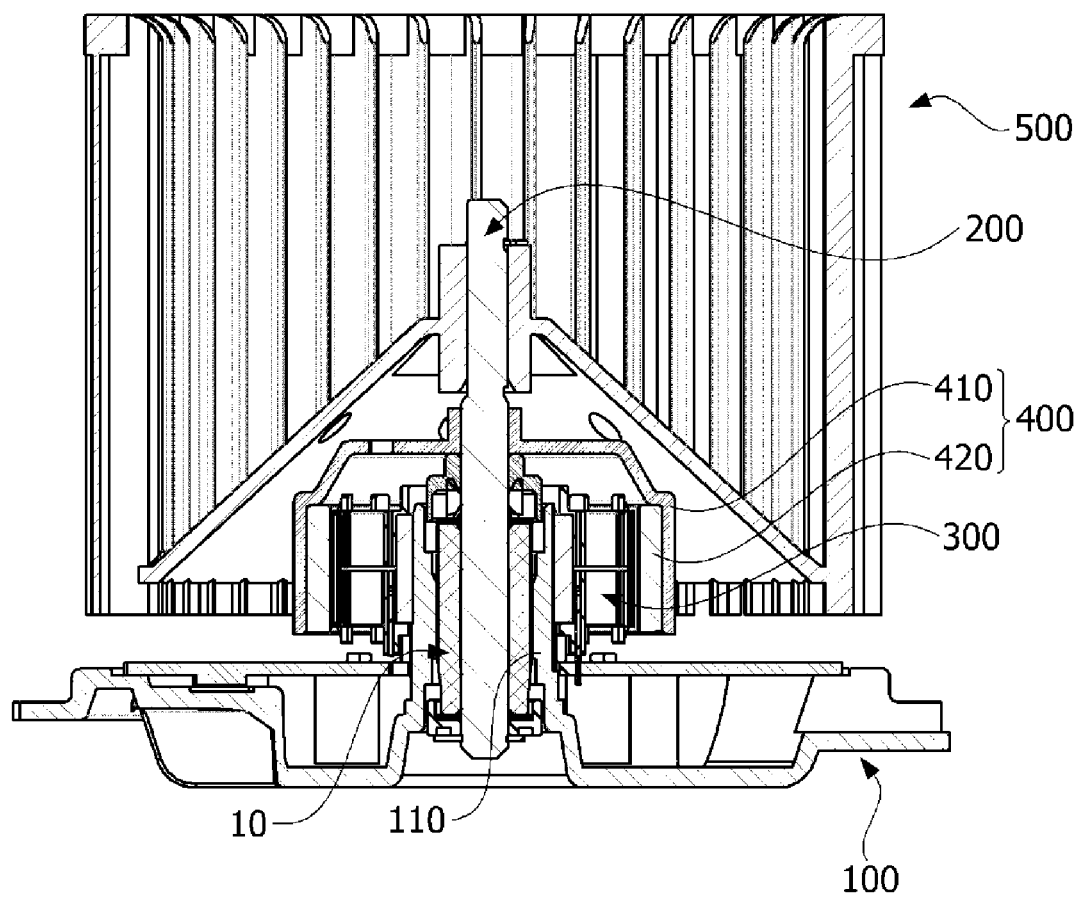
FIG. 1 is a view illustrating a fan motor according to an embodiment.

FIG. 1 is a view illustrating a fan motor according to an embodiment.

Referring to FIG. 1, the fan motor according to the embodiment may include a housing 100, a rotating shaft 200, a stator 300, a rotor 400, and a fan 500.

A blowhole configured to discharge suctioned air and a flow path corresponding thereto may be provided in the housing 100. Also, the housing 100 may include a columnar portion 110. The columnar portion 110 may be formed to vertically protrude from a bottom surface of the housing 100. Also, the columnar portion 110 may be formed to be hollow.

A sintered bearing 10 may be installed inside the columnar portion 110.

The rotating shaft 200 is fitted to the sintered bearing 10 and rotatably disposed inside the columnar portion 110. The rotating shaft 200 is connected to the rotor 400. Also, an upper end of the rotating shaft 200 may be connected to the fan 500.

The stator 300 may be fitted and coupled to the columnar portion 110. The stator 300 causes an electrical interaction with the rotor 400 and induces rotation of the rotor 400. To cause the electrical interaction with the rotor 400, a coil may be wound around the stator 300. A specific configuration of the stator for winding a coil is as follows.

The stator 300 may include a stator core including plurality of teeth. The stator core may have an annular yoke that is inserted into the columnar portion 110 and teeth formed outward from the yoke. The teeth may be provided at predetermined intervals along a circumference of the yoke. Meanwhile, the stator core may be formed by stacking a plurality of plates in the form of a thin steel plate on one another.

The rotor 400 is disposed outside the stator 300. The rotor 400 may include a yoke 410 and a magnet 420. An upper surface of the yoke 410 is coupled to the rotating shaft 200. Consequently, the yoke 410 rotates about the rotating shaft 200. A side portion of the yoke 410 is disposed to face the stator 300. The magnet 420 is attached to an inner circumferential surface of such a side portion of the yoke 410.

The fan 500 is coupled to the rotating shaft 200. As the rotating shaft 200 rotates, the fan 500 rotates and blows air.

Figure 2:
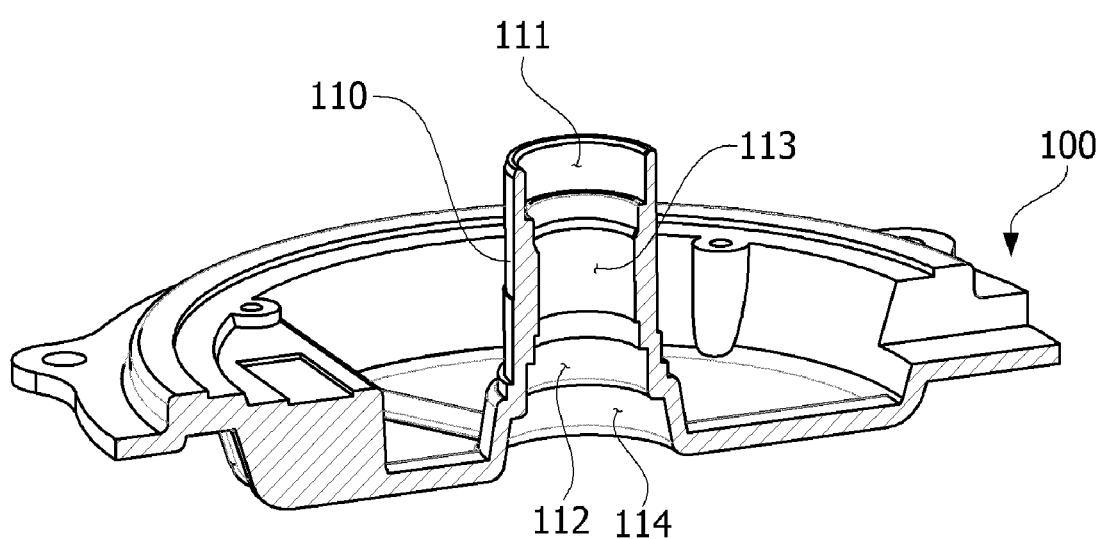
FIG. 2 is a view illustrating a columnar portion of a housing.

FIG. 2 is a view illustrating a columnar portion of a housing.

Referring to FIG. 2, a columnar portion 110, which is hollow, may be formed at a central portion of a housing 100. The columnar portion 110 may be formed so that an upper portion and a lower portion thereof are open. Such a columnar portion 110 may include a first accommodating portion 111, a second accommodating portion 112, and a third accommodating portion 113. The first accommodating portion 111 is formed at an upper end of the columnar portion 110. Also, the second accommodating portion 112 is formed at a lower end of the columnar portion 110. Also, the third accommodating portion 113 is formed at an intermediate portion of the columnar portion 110.

In the fan motor according to the embodiment, the columnar portion 110 of the housing 100 may selectively accommodate a sintered bearing 10 and a ball bearing 20. The sintered bearing 10 is in the form of a longitudinally long rod, and the ball bearing 20 is in the form of a short rod whose length is relatively short and diameter is relatively large. In this way, shapes or sizes of the sintered bearing 10 and the ball bearing 20 are different.

The columnar portion 110 is configured to accommodate the ball bearing 20 in each of the first accommodating portion 111 and the second accommodating portion 112 and accommodate the sintered bearing 10 in the third accommodating portion 113. In this way, the columnar portion 110 is configured to selectively accommodate any one of the sintered bearing 10 and the ball bearing 20 as necessary.

The specific configuration of the columnar portion 110 is as follows.

Figure 3:
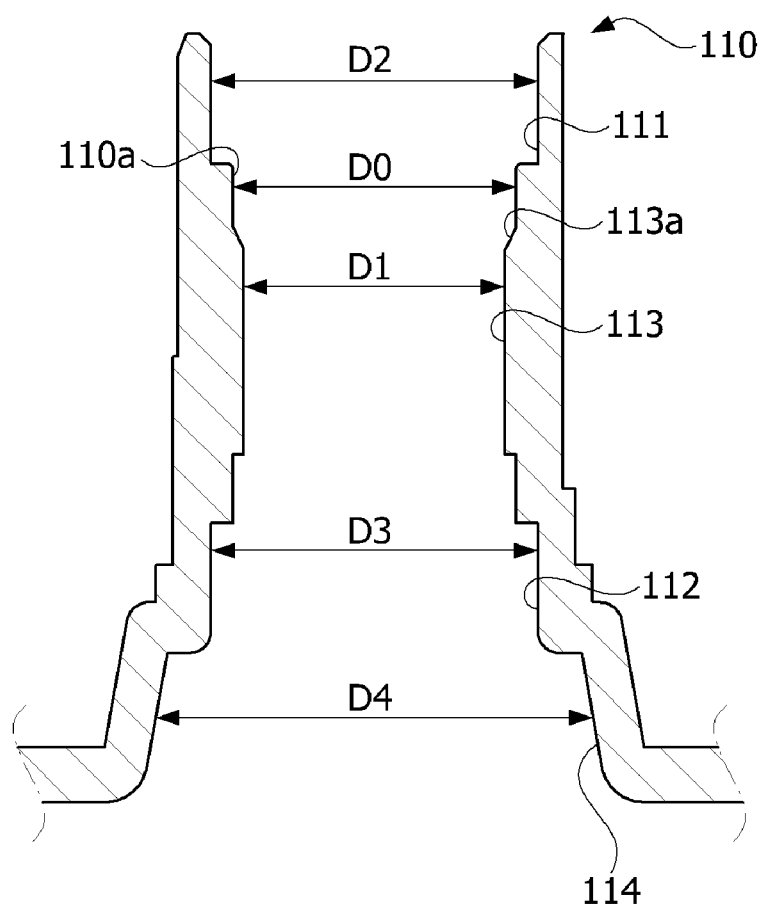
FIG. 3 is a view illustrating a first accommodating portion, a second accommodating portion, and a third accommodating portion.

FIG. 3 is a view illustrating a first accommodating portion, a second accommodating portion, and a third accommodating portion.

Referring to FIG. 3, an inner diameter D2 of a first accommodating portion 111 and an inner diameter D3 of a second accommodating portion 112 are formed to be larger than an inner diameter D0 of an inner circumferential surface 110a of a columnar portion 110. Consequently, the columnar portion 110 is configured so that a ball bearing 20 is accommodated therein by a step formed between the first accommodating portion 111 and the inner circumferential surface 110a of the columnar portion 110 and a step formed between the second accommodating portion 112 and the inner circumferential surface of the columnar portion 110.

An inner diameter D1 of the third accommodating portion 113 is formed to be smaller than the inner diameter D0 of the columnar portion 110. Consequently, an outer circumferential surface of a sintered bearing 10 inserted into the columnar portion 110 is configured to be press-fitted and fixed to the third accommodating portion 113.

Meanwhile, a spatial portion 114 may be provided below the second accommodating portion 112. The spatial portion 114 is utilized as a space for storing oil that leaks during operation of the sintered bearing 10 and a space for installing a cover portion. Such a spatial portion 114 may be formed to have an inner diameter D4 which is larger than the inner diameter D3 of the second accommodating portion 112.

The inner diameter D2 of the first accommodating portion 111 and the inner diameter D3 of the second accommodating portion 112 may be formed to be the same. Alternatively, the inner diameter D2 of the first accommodating portion 111 and the inner diameter D3 of the second accommodating portion 112 may be formed to be different corresponding to the size of the ball bearing 20 accommodated therein.

A boundary between the third accommodating portion 113 and the inner circumferential surface 110a of the columnar portion 110 may be formed with a chamfered surface 113a. This is to facilitate press-fitting when the sintered bearing 10 is press-fitted to the third accommodating portion 113.

Figure 4:
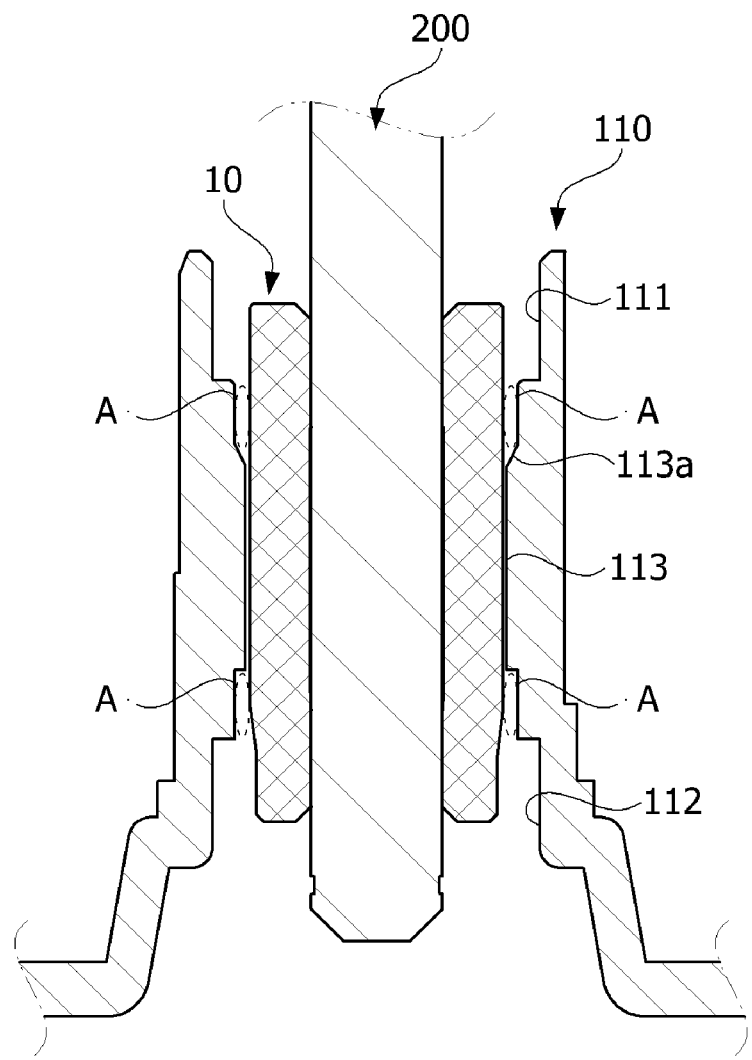
FIG. 4 is a view illustrating a sintered bearing inserted into the housing.

FIG. 4 is a view illustrating a sintered bearing inserted into the housing.

Referring to FIG. 4, when, from a sintered bearing 10 and a ball bearing 20, the sintered bearing 10 is selected and used, the sintered bearing 10 is press-fitted and coupled to a third accommodating portion 113 of a columnar portion 110. In a state in which an intermediate portion of the sintered bearing 10 is in contact with an inner wall of the third accommodating portion 113, an upper end of the sintered bearing 10 is spaced apart from an inner wall of a first accommodating portion 111, and a lower end of the sintered bearing 10 is spaced apart from an inner wall of a second accommodating portion 112.

Particularly, because the first accommodating portion 111 and the third accommodating portion 113 are formed to be spaced apart from each other, and the second accommodating portion 112 and the third accommodating portion 113 are formed to be spaced apart from each other, the sintered bearing 10 is also spaced apart from the inner circumferential surface 110a of the columnar portion 110 and forms an empty space such as space A in FIG. 4. The space A may be utilized as an escape space that prevents reduction of an inner diameter of the sintered bearing 10 during the press-fitting of the sintered bearing 10.

Further, during the press-fitting of the sintered bearing 10, to prevent the reduction of the inner diameter of the sintered bearing 10, an inner diameter of an upper end of the sintered bearing 10 and an inner diameter of a lower end of the sintered bearing 10 are formed to be smaller than an inner diameter of an intermediate portion of the sintered bearing 10 which is in contact with the inner wall of the third accommodating portion 113.

Figure 5:
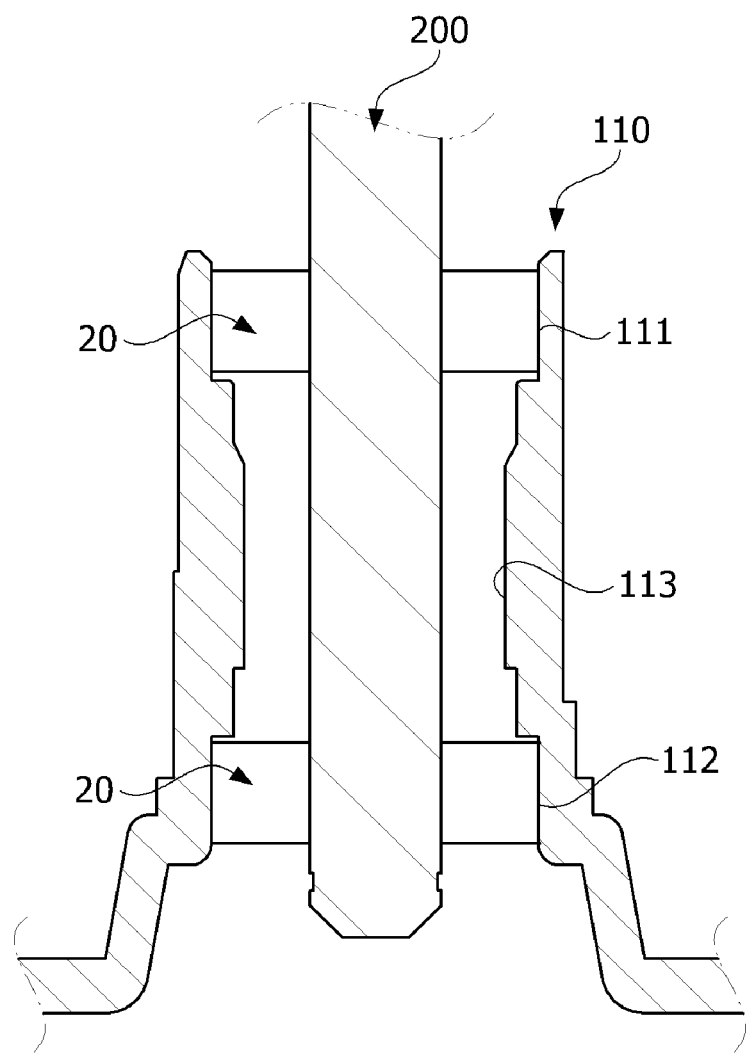
FIG. 5 is a view illustrating a ball bearing inserted into the housing.

FIG. 5 is a view illustrating a ball bearing inserted into the housing.

Referring to FIG. 5, when, from a sintered bearing 10 and a ball bearing 20, the ball bearing 20 is selected and used, the ball bearing 20 is press-fitted to each of the first accommodating portion 111 and the second accommodating portion 112 of a columnar portion 110. The ball bearing 20 is press-fitted to the first accommodating portion 111 through the open upper portion of the columnar portion 110. The ball bearing 20 is press-fitted to the second accommodating portion 112 through the open lower portion of the columnar portion 110.

Figure 6:
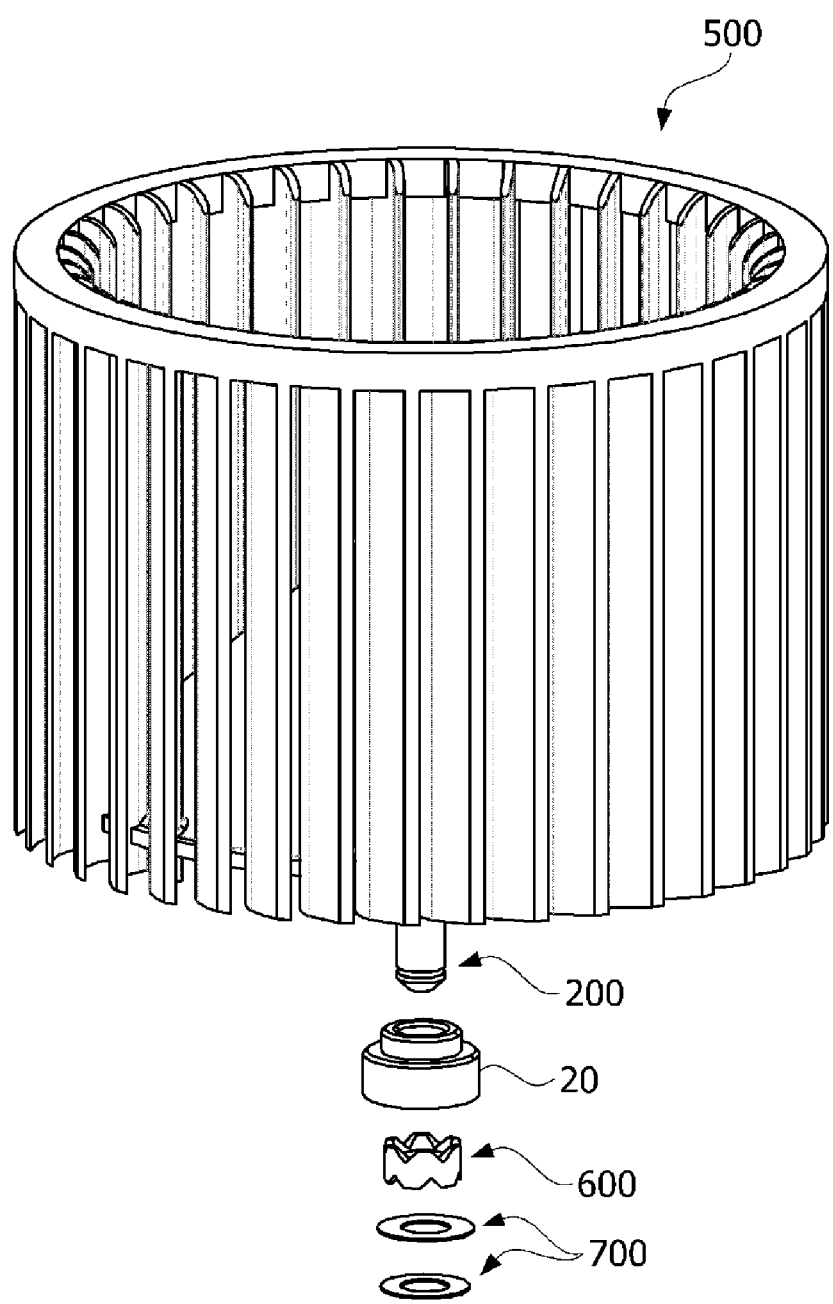
FIG. 6 is a view illustrating a support structure of an upper end of a rotating shaft.
Figure 7:
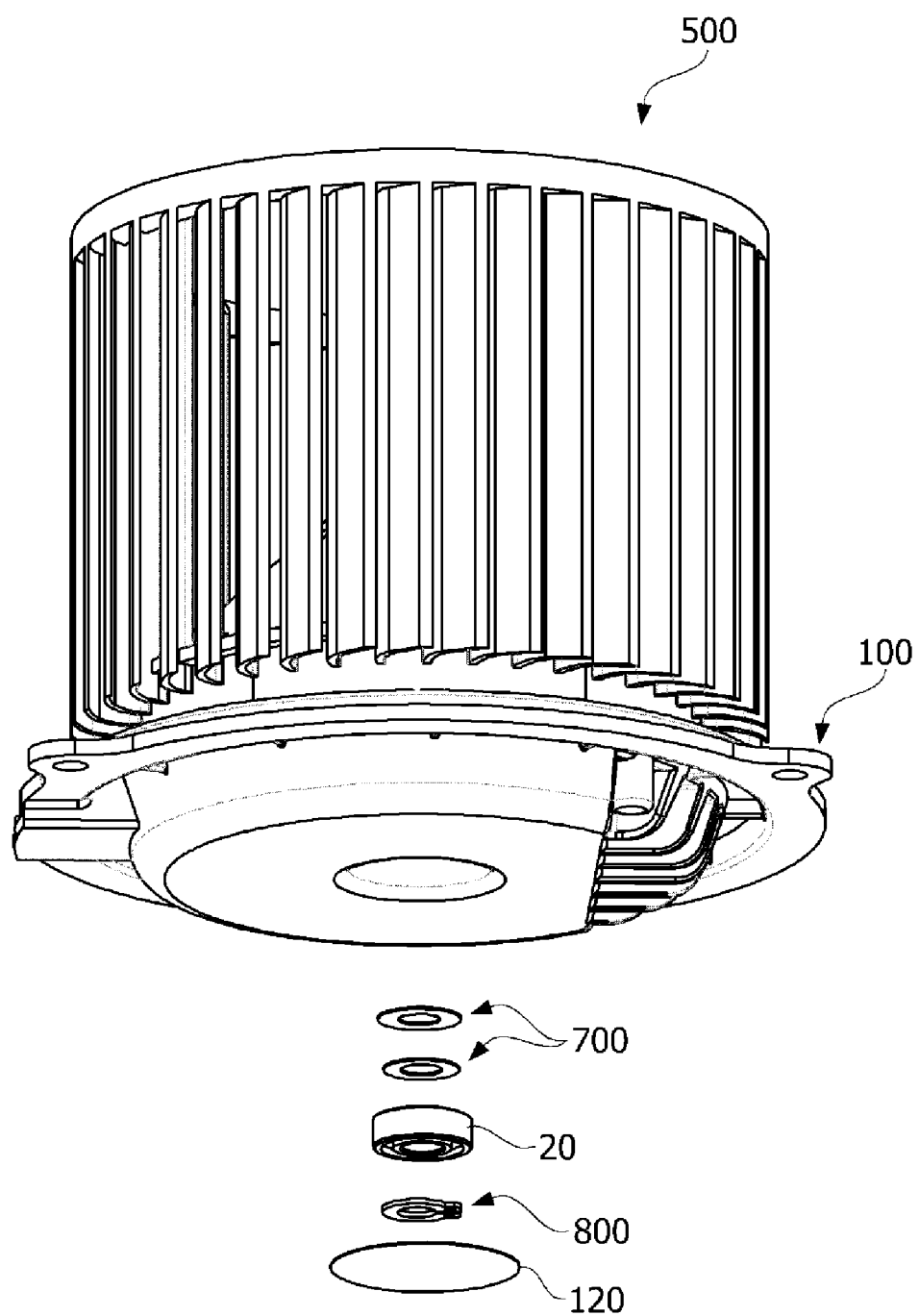
FIG. 7 is a view illustrating a support structure of a lower end of the rotating shaft.

FIG. 6 is a view illustrating a support structure of an upper end of a rotating shaft, and FIG. 7 is a view illustrating a support structure of a lower end of a rotating shaft.

Referring to FIG. 6, as a support structure of an upper end of a rotating shaft 200, a washer 700 and a damper 600 may be installed in the first accommodating portion 111 (see FIG. 2). The washer 700 and the damper 600 serve to support an axial load and absorb vibration.

Referring to FIG. 7, as a support structure of a lower end of a rotating shaft 200, a washer 700 may be installed in the second accommodating portion 112 (see FIG. 2). Also, a stop ring 800 may be installed at the lower end of the rotating shaft 200. In addition, an open lower portion of a columnar portion 110 is covered by a cover portion 120.

The fan motor and vehicle including the same according to one exemplary embodiment of the present invention have been described in detail above with reference to the accompanying drawings.

The above description is merely illustrative of the technical idea of the present invention. Those of ordinary skill in the art to which the present invention pertains should be able to make various modifications, changes, and substitutions within the scope not departing from essential characteristics of the present invention. Therefore, the embodiments disclosed herein and the accompanying drawings are for describing, instead of limiting, the technical idea of the present invention, and the scope of the technical idea of the present invention is not limited by the embodiments and the accompanying drawings. The scope of the present invention should be interpreted on the basis of the claims below, and all technical ideas within the equivalent scope should be interpreted as belonging to the scope of the present invention.

DESCRIPTION OF REFERENCE NUMERALS

10: sintered bearing, 20: ball bearing, 100: housing, 110: columnar portion, 111: first accommodating portion, 112: second accommodating portion, 113: third accommodating portion, 120: cover portion, 200: rotating shaft, 300: stator, 400: rotor, 410: yoke, 420: magnet, 500: fan, 600: damper, 700: washer.

The invention claimed is:

1. A fan motor comprising:
a rotating shaft;
a stator including a hole in which the rotating shaft is disposed;
a rotor disposed outside the stator;
a fan coupled to the rotating shaft; and
a housing disposed below the fan, wherein:
the housing includes a columnar portion protruding upward in a cylindrical shape from a lower surface of the housing and having an inner circumferential surface;
the rotating shaft is rotatably inserted into the columnar portion;
the columnar portion is disposed inside the stator;
the rotating shaft is disposed inside the columnar portion;
the stator is coupled to an outer side of the columnar portion;
the rotor is coupled to the rotating shaft and disposed outside the stator;
the fan is coupled to the rotating shaft;
the columnar portion includes a first accommodating portion, a second accommodating portion, and a third accommodating portion;
the third accommodating portion is disposed between the first accommodating portion and the second accommodating portion;
the inner circumferential surface is disposed between the third accommodating portion and the first accommodating portion and between the second accommodating portion and the third accommodating portion, respectively;
the first accommodating portion and the second accommodating portion have an inner diameter larger than an inner diameter of the inner circumferential surface of the columnar portion, respectively;
the third accommodating portion has inner diameter is smaller than a diameter of the inner circumferential surface of the columnar portion; and
wherein a boundary between the third accommodating portion and the inner circumferential surface of the columnar portion comprises a chamfered surface.

2. The fan motor of claim 1, further comprising a ball bearing,
wherein the ball bearing is disposed at the first accommodating portion and the second accommodating portion.

3. The fan motor of claim 1, further comprising a sintered bearing,
wherein the sintered bearing is disposed at the third accommodating portion.

4. The fan motor of claim 3, wherein in the radial direction, the sintered bearing and the inner circumferential surface of the columnar portion are disposed to be spaced apart from each other.

5. The fan motor of claim 4, wherein in the radial direction, the sintered bearing and the chamfered surface are disposed to be spaced apart from each other.

6. The fan motor of claim 1, wherein the columnar portion comprises a spatial portion having an inner diameter larger than the inner diameter of the second accommodating portion below the second accommodating portion.

7. The fan motor of claim 2, wherein:
the first accommodating portion and the second accommodating portion comprise a washer; and
the first accommodating portion comprises a damper disposed between the washer and the ball bearing.

8. The fan motor of claim 1, wherein the inner diameter of the first accommodating portion and the inner diameter of the second accommodating portion are the same.

9. The fan motor of claim 3, further comprising a spatial portion disposed between the sintered bearing and the inner circumferential surface of the columnar portion.

10. The fan motor of claim 3, wherein an inner diameter of the sintered bearing in an area horizontally corresponding to the third accommodating portion and an inner diameter of the sintered bearing in an area horizontally corresponding to the first accommodating portion and the second accommodating portion are different.

11. The fan motor of claim 2, further comprising a stepped portion disposed between the first accommodating portion and the second accommodating portion and the inner circumferential surface of the columnar portion so that the ball bearing is seated thereon.

* * * * *